United States Patent
Honma et al.

(10) Patent No.: US 9,128,535 B2
(45) Date of Patent: Sep. 8, 2015

(54) PORTABLE ELECTRONIC DEVICE, CONTROL METHOD, AND CONTROL PROGRAM

(75) Inventors: Hisae Honma, Kanagawa (JP); Nayu Nomachi, Kanagawa (JP); Hiroyuki Bamba, Kanagawa (JP)

(73) Assignee: KYOCERA CORPORATION, Kyoto (JP)

(*) Notice: Subject to any disclaimer, the term of this patent is extended or adjusted under 35 U.S.C. 154(b) by 226 days.

(21) Appl. No.: 13/350,193

(22) Filed: Jan. 13, 2012

(65) Prior Publication Data
US 2012/0185617 A1 Jul. 19, 2012

(30) Foreign Application Priority Data

Jan. 14, 2011 (JP) .................................. 2011-006269

(51) Int. Cl.
G06F 3/00 (2006.01)
G06F 13/00 (2006.01)
G06F 3/023 (2006.01)
G06F 17/20 (2006.01)

(52) U.S. Cl.
CPC .............. G06F 3/0237 (2013.01); G06F 17/20 (2013.01)

(58) Field of Classification Search
CPC .............. G06F 3/00; G06F 3/05; G06F 3/16; G06F 5/00
USPC ...................................... 710/39, 1, 8, 14, 104
See application file for complete search history.

(56) References Cited

U.S. PATENT DOCUMENTS

| | | | | |
|---|---|---|---|---|
| 3,183,488 A | * | 5/1965 | Bloch et al. | 710/104 |
| 3,308,443 A | * | 3/1967 | Couleur et al. | 710/8 |
| 3,344,401 A | * | 9/1967 | MacDonald et al. | 710/1 |
| 6,906,655 B1 | * | 6/2005 | Cox | 341/155 |
| 7,028,019 B2 | * | 4/2006 | McMillan et al. | 707/691 |

(Continued)

FOREIGN PATENT DOCUMENTS

| | | | | |
|---|---|---|---|---|
| EP | 1753200 A1 | * | 2/2007 | H04L 29/06 |
| EP | 1753200 A1 | * | 2/2007 | H04L 29/06 |

(Continued)

OTHER PUBLICATIONS

Machine (English) Translation of Japanese Publication No. 05-290027.

(Continued)

*Primary Examiner* — Idriss N Alrobaye
*Assistant Examiner* — Getente A Yimer
(74) *Attorney, Agent, or Firm* — Lowe Hauptman & Ham, LLP (57) ABSTRACT

The portable electronic device includes an operation unit, a storage unit, a setting unit, and a control unit. The operation unit inputs characters. The storage unit stores a first conversion table and a second conversion table different from the first conversion table. The second conversion table is different from the first conversion table. The setting unit sets a first mode and a second mode. In a case in which the first mode has been set by the setting unit, the control unit refers to the first conversion table when characters input by way of an operation of the operation unit are converted into another type of characters or character set. In a case in which the second mode has been set by the setting unit, the control unit refers to the second conversion table when characters input by way of an operation of the operation unit are converted into another type of characters or character set.

7 Claims, 4 Drawing Sheets

(56) References Cited

U.S. PATENT DOCUMENTS

| | | | |
|---|---|---|---|
| 7,657,354 B2* | 2/2010 | Breed et al. | 701/45 |
| 7,979,609 B2* | 7/2011 | Hotta et al. | 710/62 |
| 8,410,915 B2* | 4/2013 | Mizoguchi | 340/407.1 |
| 8,424,042 B2* | 4/2013 | Yamamoto et al. | 725/58 |
| 2006/0218321 A1* | 9/2006 | Hotta et al. | 710/62 |
| 2006/0224992 A1* | 10/2006 | Rossi et al. | 715/781 |
| 2007/0039037 A1* | 2/2007 | Son et al. | 726/2 |
| 2009/0226009 A1* | 9/2009 | Huyts et al. | 381/107 |
| 2009/0259779 A1* | 10/2009 | Hotta et al. | 710/62 |
| 2011/0179372 A1* | 7/2011 | Moore et al. | 715/773 |

FOREIGN PATENT DOCUMENTS

| | | | | |
|---|---|---|---|---|
| EP | 2447871 A1 * | 5/2012 | | G06F 21/00 |
| EP | 1668473 B1 * | 11/2012 | | H04M 1/67 |
| JP | S63-016368 A | 1/1988 | | |
| JP | H05-067079 A | 3/1993 | | |
| JP | 05-290027 A | 11/1993 | | |
| JP | 2002222250 A | 8/2002 | | |
| JP | 2009-199238 A | 9/2009 | | |
| JP | 2010205188 A | 9/2010 | | |

OTHER PUBLICATIONS

Notice of Reasons for Rejection issued to JP Application No. 2011-006269, mailed May 20, 2014.

Notice of Reasons for Rejection from corresponding Japanese Patent Application No. 2011-006269, p. 1 (Oct. 21, 2014.

* cited by examiner

PORTABLE ELECTRONIC DEVICE, CONTROL METHOD, AND CONTROL PROGRAM

This application is based on and claims the benefit of priority from Japanese Patent Application No. 2011-006269, filed on 14 Jan. 2011, the content of which is incorporated herein by reference.

BACKGROUND OF THE INVENTION

1. Field of the Invention

The present invention relates to a portable electronic device, a control method and a control program, which include a word-processing function.

2. Related Art

Portable electronic devices, which are capable of selectively using various modes depending on the level and age of the user, are now emerging. Examples of such modes include, for example, an adult mode used by an adult, a child mode used by a child, or a simple mode and a normal mode.

A technique for converting an input character (for example, a hiragana character string "wa to ku shi" meaning "I") into another character (for example, a kanji character "watakushi" meaning "I") is disclosed in, for example, Japanese Unexamined Patent Application, Publication No. H05-290027.

Such a technique is employed in portable electronic devices, and utilized in various kinds of character conversion.

SUMMARY OF THE INVENTION

A portable electronic device according to an embodiment of the present invention includes an operation unit, a storage unit, a setting unit, and a control unit. The operation unit inputs characters. The storage unit stores a first conversion table and a second conversion table. The first conversion table and the second conversion table are referred to when a character that was input by way of an operation of the operation unit is converted into another character. The second conversion table is different from the first conversion table. The setting unit sets a first mode and a second mode different from the first mode.

In a case in which the first mode has been set by the setting unit, the control unit refers to the first conversion table when a character that was input by way of an operation of the operation unit is converted into another character. In a case in which the second mode has been set by the setting unit, the control unit refers to the second conversion table when a character that was input by way of an operation of the operation unit is converted into another character.

A control method according to an embodiment of the present invention includes a setting step and a controlling step. In the setting step, a first mode and a second mode different from the first mode are set. In the controlling step, when a character that was input by way of an operation of the operation unit is converted into another character, in a case in which the first mode has been set in the setting step, a first conversion table is referred to. In the controlling step, in a case in which the second mode has been set in the setting step, a second conversion table is referred to. The first conversion table and the second conversion table are used for converting an input character into another character. The second conversion table is different from the first conversion table.

A control program according to an embodiment of the present invention implements a setting step and a controlling step by way of a computer. In the setting step, a first mode and a second mode different from the first mode are set. In the controlling step, when a character that was input by way of an operation of the operation unit is converted into another character, in a case in which the first mode has been set in the setting step, a first conversion table is referred to. In the controlling step, in a case in which the second mode has been set in the setting step, a second conversion table is referred to. The first conversion table and the second conversion table are used for converting an input character into another character. The second conversion table is different from the first conversion table.

According to the embodiment of the present invention, conversion functions can be used selectively and efficiently when inputting characters.

BRIEF DESCRIPTION OF THE DRAWINGS

FIG. 4 is a view showing screen transition in cases in which the first conversion table and the second conversion table are referred to.

DETAILED DESCRIPTION OF THE INVENTION

Figure 1:
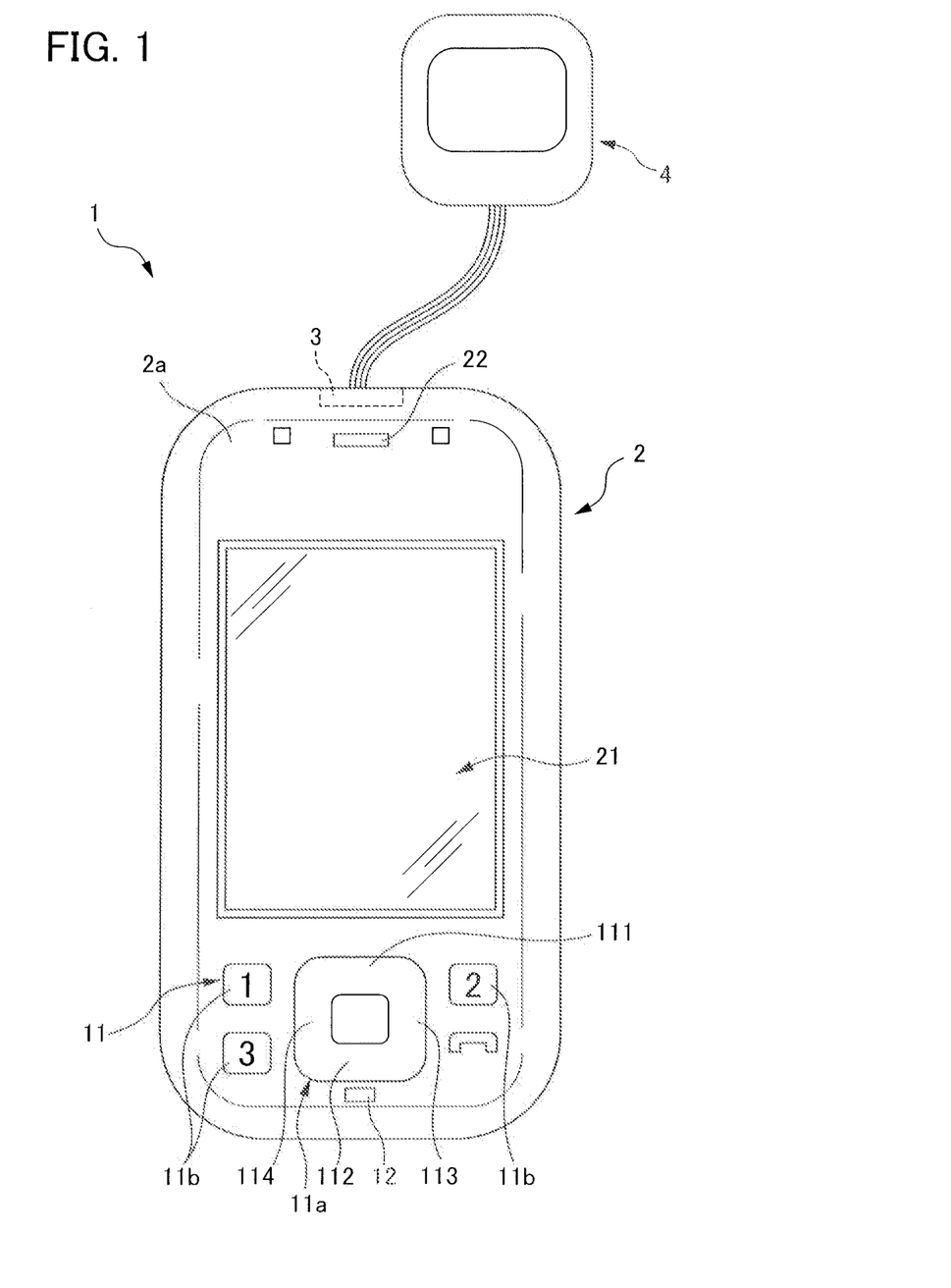
FIG. 1 is a perspective view showing an appearance of a cellular telephone device.

A preferred embodiment for carrying out the present invention is hereinafter described with reference to the drawings. First of all, with reference to FIG. 1, descriptions are provided for a basic structure of a cellular telephone device 1 according to an embodiment of the portable electronic device of the present invention. FIG. 1 is a perspective view showing an appearance of a cellular telephone device 1.

The cellular telephone device 1 is a cellular telephone device of a straight type. The cellular telephone device 1 is configured to include a body 2, a sliding member 3, and a strap 4. The sliding member 3 is attached to the body 2 so as to slide in a certain direction by a predetermined amount. The strap 4 is connected to the sliding member 3. The cellular telephone device 1 has a security alarm function in addition to a telephone call function. The security alarm function is a function, in which a user who sensed danger operates the cellular telephone device 1 to generate sound at full blast, thereby drawing attention of people around the user. More specifically, in the cellular telephone device 1, when the strap 4 is pulled by a predetermined force, the sliding member 3 slides in a certain direction by a predetermined amount. This sliding triggers the cellular telephone device 1 to generate sound at full blast resounding through the surroundings, thereby drawing attention of people around the user. In this case, a control unit 45 to be described later is informed of the fact that the security alarm is ringing due to the strap 4 being pulled by a predetermined force, and performs emergency notification by utilizing a function such as email. Examples of contact entities of such emergency notification include, for example, a cooperating security company, a family, a school, the police, etc.

An operation unit 11, a display unit 21, a microphone 12 and a speaker 22 are disposed on a front face 2a of the body 2. The operation unit 11 includes: a plurality of direction designating keys 11a as direction designating means; and function activating keys 11b. The plurality of direction designating keys 11a designate directions different from one another. The function activating keys 11b activate functions. Here, a physically single key may be employed in place of the plurality of direction designating keys 11*a*, in which different functions are assigned to upper, right, lower and left directions as shown in FIG. 1. In the present embodiment, the direction designating keys 11*a* are configured to include an upper key 111, a lower key 112, a right key 113, and a left key 114. The upper key 111 designates an upper direction. The lower key 112 designates a lower direction. The right key 113 designates a right direction. The left key 114 designates a left direction. The direction designating keys 11*a* may be anything that can designate a plurality of directions. Examples of those being capable of designating a plurality of directions include, for example, a joystick, or a track ball, or other pointing devices.

For example, a liquid crystal display or an organic EL (electroluminescence) display is employed as the display unit 21. The microphone 12 inputs sound produced by the user of the cellular telephone device 1 during a telephone call. The speaker 22 outputs sound of the other party of a telephone call when using the cellular telephone device 1.

It should be noted that the cellular telephone device 1 is not limited to the aforementioned straight type. In other words, a slider type, a rotating type, a flip type or a 2-axis hinge type can be employed for the cellular telephone device. In a cellular telephone device of the slider type, in a state where a first body and a second body are mutually superimposed, one of the bodies slides in one direction. In a cellular telephone device of the rotating type, in a state where the first body and the second body are mutually superimposed, one of the bodies is rotated around an axis line along the direction of superimposing the bodies. In a cellular telephone device of the flip type, the first body and the second body are connected via a hinge mechanism. In a cellular telephone device of the 2-axis hinge type, the first body and the second body are connected via a 2-axis hinge.

Figure 2:
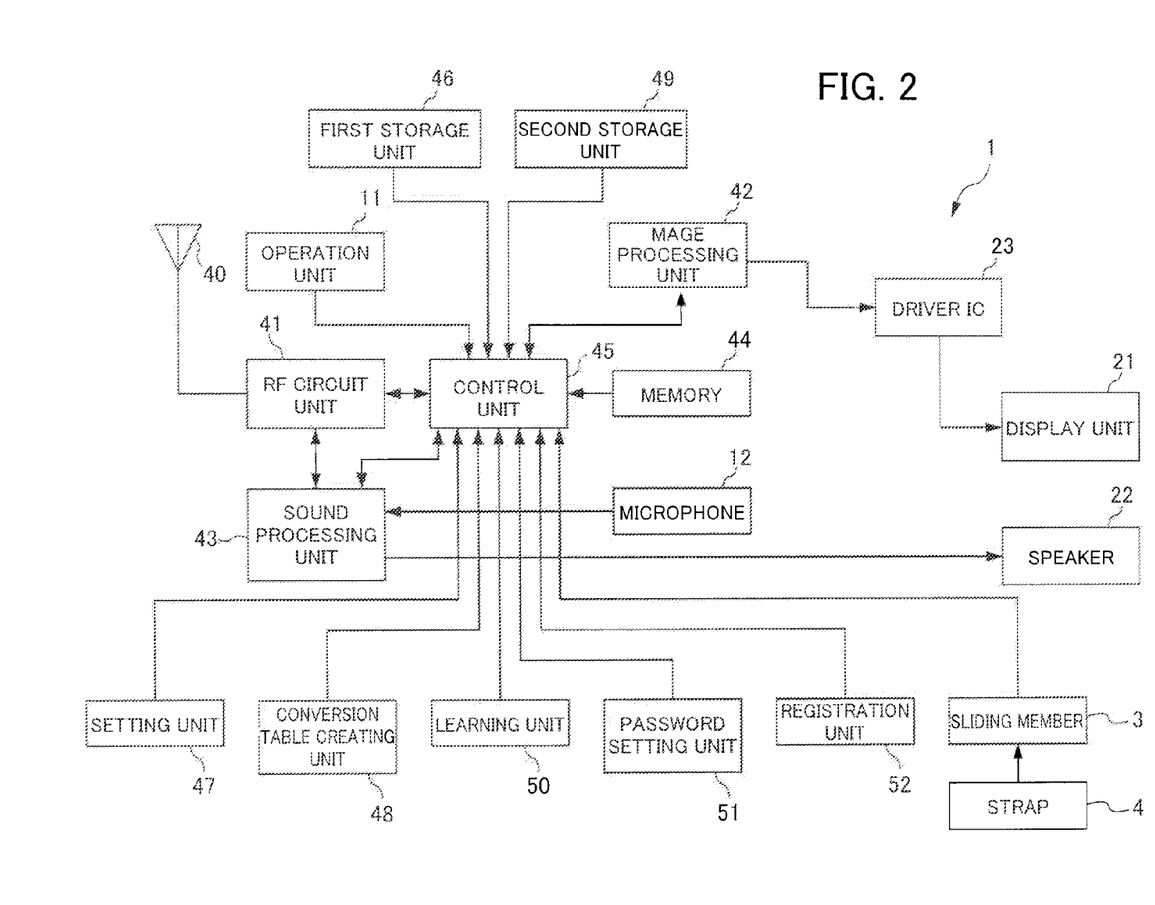
FIG. 2 is a functional block diagram showing functions of the cellular telephone device.

Next, a functional configuration of the cellular telephone device 1 is described. FIG. 2 is a functional block diagram showing functions of the cellular telephone device 1. The cellular telephone device 1 includes: the operation unit 11, the microphone 12, a main antenna 40, an RF circuit unit 41, an image processing unit 42, a sound processing unit 43, memory 44, the control unit 45, the display unit 21, the speaker 22, and a driver IC 23. The cellular telephone device 1 includes the sliding member 3 and the strap 4. In the cellular telephone device 1, when the strap 4 is pulled by a predetermined force, the sliding member 3 slides in a certain direction. In the cellular telephone device 1, the control unit 45 is notified of the fact that the sliding member 3 has slid.

The main antenna 40 is configured to communicate with external devices such as a base station via a predetermined usable frequency band. Examples of the predetermined usable frequency band include, for example, a frequency band including an 800 MHz band. It should be noted that, although the 800 MHz band is used as the usable frequency band in the present embodiment, other frequency bands may also be used.

The RF circuit unit 41 executes demodulation processing on a signal received via the main antenna 40. The RF circuit unit 41 transmits the processed signal to the control unit 45. The RF circuit unit 41 executes modulation processing on the signal transmitted from the control unit 45. The RF circuit unit 41 transmits the modulation-processed signal to external devices via the main antenna 40. On the other hand, the RF circuit unit 41 notifies the control unit 45 of the intensity of a signal received via the main antenna 40 (RSSI: Received Signal Strength Indication).

The image processing unit 42 executes image processing, and outputs the processed image data to the driver IC 23, according to control by the control unit 45. When the image data is transmitted from the image processing unit 42, the driver IC 23 stores the image data in frame memory. The driver IC 23 outputs the image data, which is stored in the frame memory, on the display unit 21 at predetermined timing.

The sound processing unit 43 executes sound processing on a signal transmitted from the RF circuit unit 41, according to control by the control unit 45. The sound processing unit 43 outputs the processed signal to the speaker 22. The speaker 22 externally outputs the signal that is transmitted from the sound processing unit 43.

When a signal is input from the microphone 12, the sound processing unit 43 processes the signal, according to control by the control unit 45. The sound processing unit 43 outputs the processed signal to the RF circuit unit 41. The RF circuit unit 41 executes predetermined processing on the signal transmitted from the sound processing unit 43. The RF circuit unit 41 outputs the processed signal to the main antenna 40.

The memory 44 includes, for example, working memory, and is utilized for arithmetic processing by the control unit 45. The memory 44 stores a plurality of applications as well as a variety of tables and the like required by the applications. The memory 44 may also serve as detachable external memory.

The control unit 45 controls the entirety of the cellular telephone device 1. The control unit 45 is configured to employ a central processing unit (CPU) and the like.

The cellular telephone device 1 with such a configuration has a function to enable conversion functions to be used selectively and efficiently when inputting characters. Descriptions are hereinafter provided for a configuration and operations for achieving such functions.

As shown in FIG. 2, the cellular telephone device 1 includes a first storage unit 46 and a setting unit 47.

The first storage unit 46 stores a first conversion table and a second conversion table, which are referred to when characters that were input by way of an operation of the operation unit 11 are converted into another type of characters or character set. The second conversion table is different from the first conversion table. It should be noted that the first storage unit 46 may be configured as a part of the memory 44.

The setting unit 47 sets a first mode and a second mode different from the first mode. In a case in which the first mode has been set by the setting unit 47, the control unit 45 refers to the first conversion table when characters that were input by way of an operation of the operation unit 11 are converted into another type of characters or character set. In a case in which the second mode has been set by the setting unit 47, the control unit 45 refers to the second conversion table when characters that were input by way of an operation of the operation unit 11 are converted into another type of characters or character set.

The first conversion table is, for example, a table for children, which converts hiragana characters into kanji characters within a range of learning at a primary school and a junior high school. The second conversion table is, for example, a table for adults, which converts hiragana characters into kanji characters in common use. The first mode is, for example, a mode that is used by children. The second mode is, for example, a mode that is used by adults.

The setting unit 47 may be configured to set each mode by selecting the first mode or the second mode by way of an operation of the operation unit 11 in a state where a wallpaper screen is displayed on the display unit 21. The first mode is, for example, a mode that restricts usable applications and the like to a certain level, and is a so-called child mode. The second mode is, for example, a mode that does not restrict usable applications and the like, and is a so-called adult mode.

In this way, in the cellular telephone device 1, conversion processing is executed by referring to the first conversion table in a case in which the first mode has been set, and conversion processing is executed by referring to the second conversion table in a case in which the second mode has been set. The cellular telephone device 1 can use conversion functions selectively and efficiently, in accordance with the mode that has been set.

As shown in FIG. 2, the cellular telephone device 1 may be configured to include a conversion table creating unit 48 that extracts and creates the first conversion table or the second conversion table from a single original conversion table T, in accordance with the mode that has been set by the setting unit 47.

For example, the single original conversion table T is compatible with JIS level-1 to level-4 kanji sets. In a case in which the child mode has been set by the setting unit 47, the conversion table creating unit 48 extracts kanji characters at a children's learning level from the conversion table T, and creates a table for children. In a case in which the adult mode has been set by the setting unit 47, the conversion table creating unit 48 extracts kanji characters at an adult's general learning level from the conversion table T, and creates a table for adults.

It should be noted that, although the present embodiment has been described in which the setting unit 47 sets any one of the two types of modes, i.e. the first mode and the second mode, it is not limited thereto, and the setting unit 47 may be able to set three or more modes. In a case of such a configuration, the conversion table creating unit 48 can create three or more conversion tables, and appropriately creates conversion tables being suitable for the mode that has been set by the setting unit 47.

In this way, the cellular telephone device 1 can dynamically create conversion tables in accordance with the mode that has been set by the setting unit 47, and can use conversion functions selectively and efficiently.

As shown in FIG. 2, the cellular telephone device 1 includes a second storage unit 49 and a learning unit 50. It should be noted that the second storage unit 49 may be configured as a part of the memory 44. The first storage unit 46 and the second storage unit 49 may be configured in an integrated manner.

In a case in which a character was converted by referring to the first conversion table or the second conversion table, and a corresponding relationship of characters (or sentences) before and after the conversion is not stored in the first conversion table or the second conversion table that was referred to, the learning unit 50 associates the corresponding relationship of the characters (or sentences) before and after the conversion with the first conversion table or the second conversion table that was referred to, and stores the corresponding relationship in the second storage unit 49.

In a case of referring to the first conversion table, the control unit 45 refers to the corresponding relationship of characters (or sentences) before and after the conversion associated with the first conversion table, and performs restriction so as not to refer to the corresponding relationship of characters (or sentences) before and after the conversion associated with the second conversion table; and in a case of referring to the second conversion table, the control unit 45 refers to the corresponding relationship of characters (or sentences) before and after the conversion associated with the second conversion table, and performs restriction so as not to refer to the corresponding relationship of characters (or sentences) before and after the conversion associated with the first conversion table.

For example, in a case in which characters are converted by referring to the first conversion table, and the first conversion table does not include any conversion candidate corresponding to a hiragana character string "shi n sho u bo u da i" that was input, the hiragana character string is divided into segments "shi n sho u" and "bo u da i", and by referring to the first conversion table, a hiragana character string "shi n sho u" is converted into a kanji character string "shin shou" from among conversion candidates, and a hiragana character string "bo u da i" is converted into a kanji character string "bou dai" from among conversion candidates. In such a case, the learning unit 50 associates the corresponding relationship of the hiragana character string "shi n sho u bo u da i" before the conversion and the kanji character string "shin shou bou dai" after the conversion with the first conversion table, and stores the corresponding relationship in the second storage unit 49.

In a case in which characters are converted by referring to the second conversion table, and the second conversion table does not include any conversion candidate corresponding to a hiragana character string "go ri mu chu" that was input, the hiragana character string is divided into segments "go ri" and "mu chu", and by referring to the second conversion table, a hiragana character string "go ri" is converted into a kanji character string "go ri" from among conversion candidates, and a hiragana character string "mu chu" is converted into a kanji character string "mu chu" from among conversion candidates. In such a case, the learning unit 50 associates the corresponding relationship of the hiragana character string "go ri mu chu" before the conversion and the kanji character string "go ri mu chu" after the conversion with the second conversion table, and stores the corresponding relationship in the second storage unit 49.

In a case of referring to the first conversion table, the control unit 45 refers to the corresponding relationship of characters before and after the conversion associated with the first conversion table, and performs restriction so as not to refer to the corresponding relationship of characters before and after the conversion associated with the second conversion table; therefore, the hiragana character string "shi n sho u bo u da i" before the conversion and the kanji character string "shin shou bou dai" after the conversion can be referred to, but the hiragana character string "go ri mu chu" before the conversion and the kanji character string "go ri mu chu" after the conversion cannot be referred to.

In a case of referring to the second conversion table, the control unit 45 refers to the corresponding relationship of characters before and after the conversion associated with the second conversion table, and performs restriction so as not to refer to the corresponding relationship of characters before and after the conversion associated with the first conversion table; therefore, the hiragana character string "go ri mu chu" before the conversion and the kanji character string "go ri mu chu" after the conversion can be referred to, but the hiragana character string "shi n sho u bo u da i" before the conversion and the kanji character string "shin shou bou dai" after the conversion cannot be referred to.

In this way, the cellular telephone device 1 associates a result learned by the learning unit 50 with only a conversion table that was used; therefore, for example, it is possible to guard a person (child) who uses the first mode (child mode) from seeing conversion processing by a person (parent) who uses the second mode (adult mode).

As shown in FIG. 2, the cellular telephone device 1 may be configured to include a password setting unit 51 that sets a password. In such a configuration, in either case in which the first mode is switched to the second mode or the second mode is switched to the first mode, the control unit 45 prompts a password to be input, and on condition that the password thus input coincides with a password that has been set in the password setting unit 51, the control unit 45 permits the switching of the modes.

With such a configuration, the cellular telephone device 1 can restrict the user (child) of the first mode (child mode) from using the second mode (adult mode).

The first conversion table may be configured such that input characters are not converted into kanji characters, or input characters can be converted into only kanji characters conforming to a predetermined kanji character table designated for each school year.

For example, the first conversion table is configured such that input hiragana characters are converted into katakana characters, or input hiragana characters can be converted into only kanji characters designated for a school year of the user, conforming to a kanji character table designated for each school year as defined in the curriculum guidelines of the Ministry of Education, Culture, Sports, Science and Technology of Japan.

With such a configuration, the cellular telephone device 1 can perform kanji character conversion in accordance with a school year of the user.

As shown in FIG. 2, the cellular telephone device 1 may be configured to include a registration unit 52 that registers a profile including an age. In such a configuration, in a case in which an input character is converted into another character, the control unit 45 selects which one of the first conversion table or the second conversion table is referred to, based on an age registered with the registration unit 52, regardless of whether the mode that has been set by the setting unit 47 is the first mode or the second mode.

The registration unit 52 may have a function to increment the registered age as the school year advances. In such a configuration, the control unit 45 will select a conversion table suitable for the grade of the user as the school year advances.

In this way, since the cellular telephone device 1 selects a conversion table in conjunction with information registered as a profile, a conversion table suitable for the grade of the user can be selected.

It should be noted that, in the present embodiment, although the conversion tables have been described to include two conversion tables, i.e. the first conversion table and the second conversion table, the conversion tables are not limited thereto, and may be configured to include three or more conversion tables. More specifically, the conversion tables may be configured with: six conversion tables for primary schoolchildren, three conversion tables for junior high students, three conversion tables for high school students, and one general conversion table for those who are in higher ages.

Figure 3:
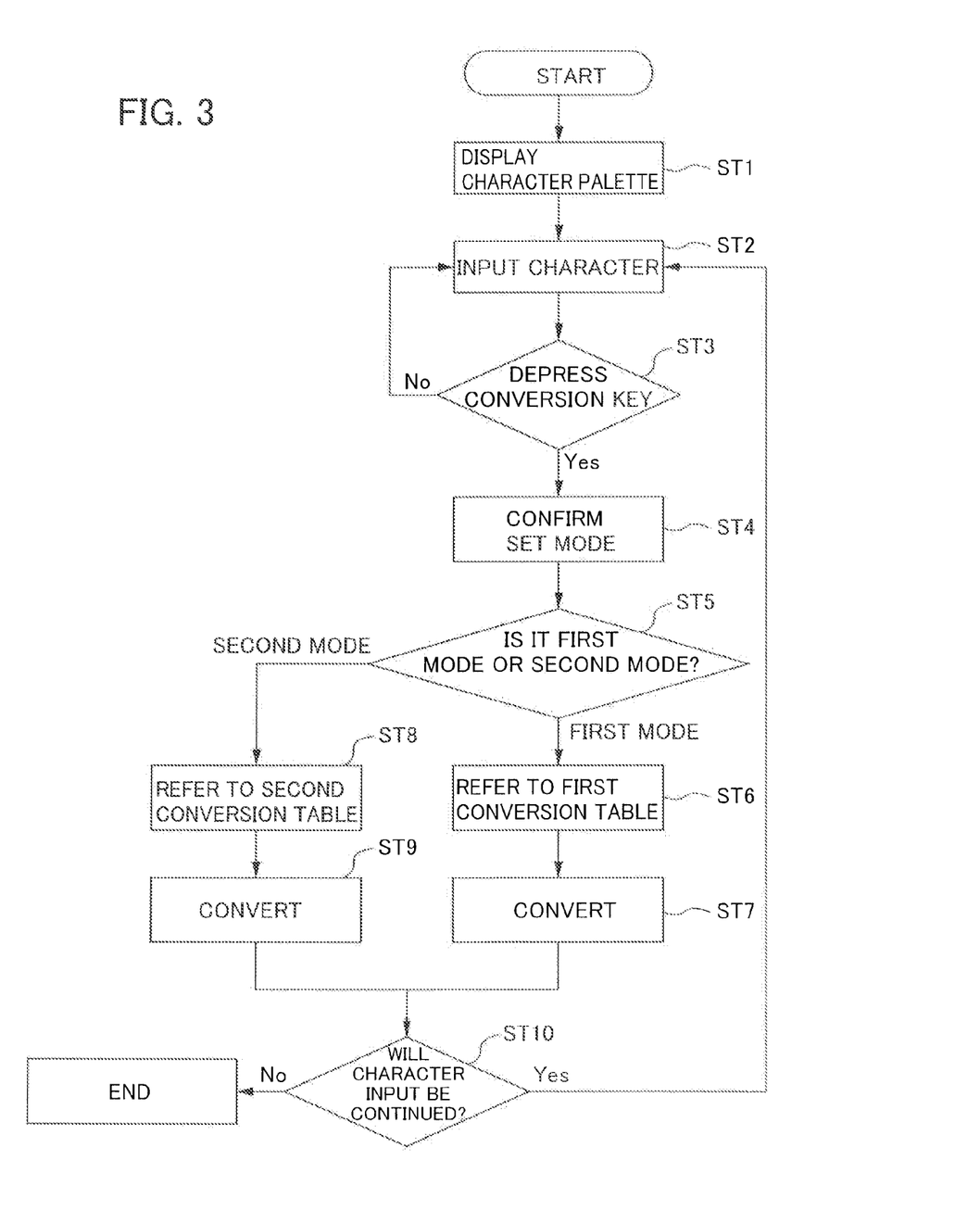
FIG. 3 is a flowchart illustrating specific processing executed by the cellular telephone device.

Next, specific processing by the cellular telephone device 1 is described with reference to the flowchart shown in the FIG. 3. It should be noted that descriptions are hereinafter provided on the assumption that an application capable of editing characters such as inputting characters (a memo pad application or an email application) is activated.

In Step ST1, the control unit 45 displays a character palette in a predetermined area of the display unit 21.

In Step ST2, in a character input area of the display unit 21, by way of an operation of the operation unit 11, the control unit 45 inputs a character selected from the character palette for selecting a character that should be input.

In Step ST3, the control unit 45 determines whether a conversion operation for the input character was performed. In a case in which the conversion operation was performed (Yes), the processing advances to Step ST4, and in a case in which the conversion operation was not performed (No), the inputting of characters is continued.

In Step ST4, the control unit 45 confirms the mode that has been set. Here, it is assumed that each mode is set by selecting the first mode (child mode) or the second mode (adult mode) by way of a predetermined operation of the operation unit 11 from the state where the wallpaper screen is displayed on the display unit 21, but it is not limited thereto.

In Step ST5, the control unit 45 determines whether the mode that has been set in Step ST4 is the first mode or the second mode. In a case in which the first mode has been set, the processing advances to Step ST6, and in a case in which the second mode has been set, the processing advances to Step ST8.

In Step ST6, the control unit 45 refers to the first conversion table, since the first mode has been set.

In Step ST7, the control unit 45 displays conversion candidates corresponding to the input character by referring to the first conversion table. The control unit 45 displays, as a selected character, a single candidate selected from among the conversion candidates, in the character input area of the display unit 21.

In Step ST8, the control unit 45 refers to the second conversion table, since the second mode has been set.

In Step ST9, the control unit 45 displays conversion candidates corresponding to the input character by referring to the second conversion table. The control unit 45 displays, as a selected character, a single candidate selected from among the conversion candidates, in the character input area of the display unit 21.

In Step ST10, based on an operation of the operation unit 11, the control unit 45 determines whether the inputting of characters is continued. In a case in which the inputting of characters is continued (Yes), the processing returns to Step ST2, and in a case in which the inputting of characters is not continued (No), the processing is terminated.

Next, with reference to FIG. 4, descriptions are provided for screen transition of the display unit 21 in a case of referring to the first conversion table, and screen transition of the display unit 21 in a case of referring to the second conversion table. It should be noted that the user of the first mode is assumed to be a child, and the user of the second mode is assumed to be an adult (parent).

Firstly, descriptions are provided for a case in which the selected mode is the first mode (child mode).

In a state where no characters are input in a character input area A1 (FIG. 4(*a*)), characters are selected from a character palette A2 by way of an operation of the operation unit 11, and the control unit 45 inputs the characters in the character input area A1 (FIG. 4(*b*)). The present embodiment is described by taking an example in which a hiragana character string "a sa" is input.

In a case in which "kanji" for requesting undetermined characters to be converted into kanji characters is selected from the character palette A2 by way of an operation of the operation unit 11, the control unit 45 displays kanji character conversion candidates A3 (FIG. 4(*c*)) in place of the character palette A2. It should be noted that the kanji character conversion candidates A3 are composed of characters that were read from the first conversion table by referring thereto. Therefore, a child who is the user can select characters such as kanji characters without feeling any discomfort.

Figure 4A:
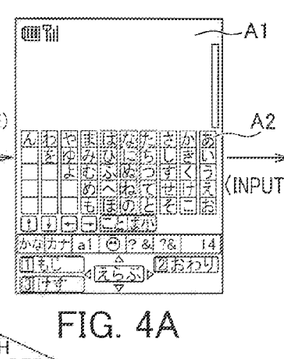
Figure 4B:
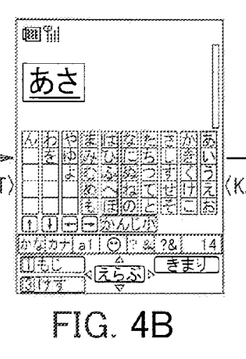
Figure 4C:
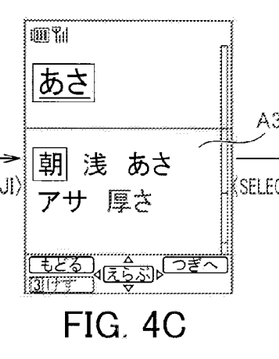
Figure 4D:
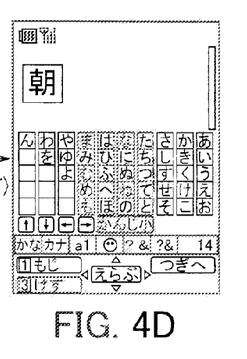

In a case in which a kanji character "asa (morning)" is selected from among the kanji character conversion candidates A3 by way of an operation of the operation unit 11 (by moving a cursor to the kanji character "asa"), and a determination operation is performed, the control unit 45 inputs the kanji character "asa" in the character input area A1 in place of the hiragana character string "a sa", and displays the character palette A2 in place of the kanji character conversion candidates A3 (FIG. 4(d)).

Secondly, descriptions are provided for a case in which the selected mode is the second mode (adult mode).

Figure 4E:
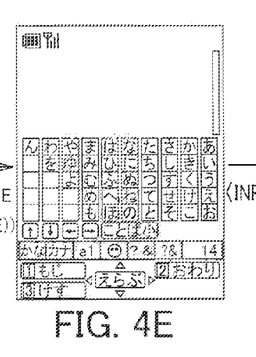
Figure 4F:
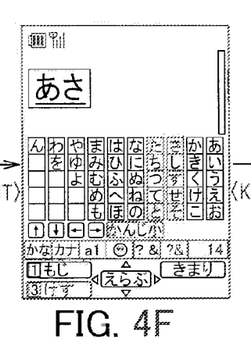

In a state where no characters are input in the character input area A1 (FIG. 4(e)), characters are selected from the character palette A2 by way of an operation of the operation unit 11, and the control unit 45 inputs the characters in the character input area A1 (FIG. 4(f)). The present embodiment is described by taking an example in which the hiragana character string "a sa" is input.

Figure 4G:
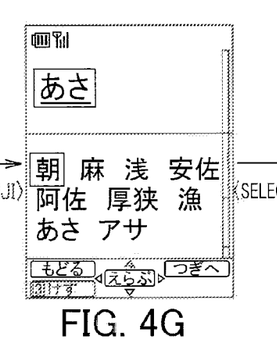

In a case in which the "kanji" for requesting undetermined characters to be converted into kanji characters is selected from the character palette A2 by way of an operation of the operation unit 11, the control unit 45 displays the kanji character conversion candidates A3 (FIG. 4(g)) in place of the character palette A2. It should be noted that the kanji character conversion candidates A3 are composed of characters that were read from the second conversion table by referring thereto. Therefore, an adult who is the user can select characters such as kanji characters without feeling any discomfort.

Figure 4H:
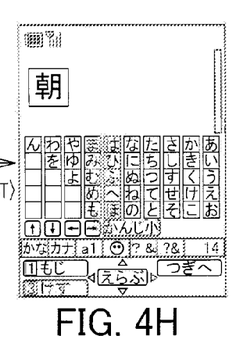

In a case in which the kanji character "asa" is selected from among the kanji character conversion candidates A3 by way of an operation of the operation unit 11 (by moving a cursor to the kanji character "asa"), and a determination operation is performed, the control unit 45 inputs the kanji character "asa" in the character input area A1 in place of the hiragana character string "a sa", and displays the character palette A2 in place of the kanji character conversion candidates A3 (FIG. 4(h)).

In this way, in the cellular telephone device 1, conversion processing is executed by referring to the first conversion table in a case in which the first mode has been set, and conversion processing is executed by referring to the second conversion table in a case in which the second mode has been set; therefore, it is possible to use conversion functions selectively and efficiently in accordance with the mode that has been set, and to provide conversion processing suitable for the position of the user by way of simple operations.

The cellular telephone device 1 has been described such that each mode is set by selecting the first mode (child mode) or the second mode (adult mode) by way of a predetermined operation of the operation unit 11 from the state where the wallpaper screen is displayed on the display unit 21, but it is not limited thereto. The cellular telephone device 1 may be configured to set a mode when inputting characters, based on whether the characters were input by way of an operation from an activation menu for parents, or the characters were input by way of an operation from an activation menu for children.

The cellular telephone device 1 may be configured to include a function that handles a plurality of mail addresses or telephone numbers. In such a configuration, the cellular telephone device 1 may be configured to switch the conversion table to be used, depending on an email address to be used. The cellular telephone device 1 may be configured to switch the conversion table to be used, depending on an email address of a transmission destination.

The cellular telephone device 1 may be configured to include a function for elderly persons, in which an elderly mode or a normal mode can be selectively set. In such a configuration, a conversion table that is used when selecting the elderly mode may be configured to include kanji characters that are not included in the kanji characters in common use, or to include season words that are used in haiku.

The cellular telephone device 1 may be configured such that, in a case in which an email message browsed in the first mode (child mode) includes a kanji character that does not exist in the first conversion table, the kanji character is displayed with hiragana or katakana characters showing its reading, by referring to the second conversion table.

The cellular telephone device 1 includes a plurality of conversion tables for primary school children, junior high school students, and high school students, respectively; and by sequentially switching from the conversion table for primary school children, to the conversion table for junior high school students, to the conversion table for high school students at predetermined timing, a person who is not familiar with kanji characters can master kanji characters. Examples of the timing for switching the conversion tables may include, for example, the user's birthday, the time when the calendar year or the school year is updated, etc.

The cellular telephone device 1 includes a plurality of conversion tables, which are referred to in order to convert a difficult word into easy word. An example of difficult word is "abstruse". And, an example of easy word is "difficult". The cellular telephone device 1 converts the word "abstruse" into the word "difficult".

What is claimed is:

1. A portable electronic device, comprising:
   an operation unit for inputting characters;
   a display unit for displaying characters that were input by way of an operation of the operation unit;
   a first storage unit that stores a first conversion table in which a plurality of first-type characters are recorded, and a second conversion table in which a plurality of second-type characters are recorded, the first conversion table being different from the second conversion table, which are referred to in order to convert characters that were input by way of an operation of the operation unit, into another type of character set;
   a setting unit capable of setting a first mode and a second mode different from the first mode;
   a conversion table creating unit that extracts and creates a first conversion table and the second conversion table from a single conversion table, in accordance with a mode that has been set by the setting unit; and
   a control unit that performs control such that, in a case in which the first mode has been set by the setting unit, the display unit displays the plurality of first-type characters recorded in the first conversion table, and when one of the first-type characters displayed on the display unit is selected by way of the operation unit, the characters displayed on the display unit are replaced with the selected type of characters; and
   in a case in which the second mode has been set by the setting unit, the display unit displays the plurality of second-type characters recorded in the second conversion table, and when one of the second-type characters displayed on the display unit is selected by way of the operation unit, the characters displayed on the display unit are replaced with the selected type of character set.

2. The portable electronic device according to claim 1, further comprising:

a second storage unit; and a learning unit, wherein, in a case in which characters were converted by referring to the first conversion table or the second conversion table, and a corresponding relationship of characters before and after such conversion is not stored in the first conversion table or the second conversion table that was referred to, the learning unit associates the corresponding relationship of the characters before and after the conversion with the first conversion table or the second conversion table that was referred to, and stores the corresponding relationship in the second storage unit, wherein, in a case of referring to the first conversion table, the control unit refers to a corresponding relationship of characters before and after the conversion associated with the first conversion table, and performs restriction so as not to refer to a corresponding relationship of characters before and after the conversion associated with the second conversion table, and wherein, in a case of referring to the second conversion table, the control unit refers to the corresponding relationship of characters before and after the conversion associated with the second conversion table, and performs restriction so as not to refer to the corresponding relationship of characters before and after the conversion associated with the first conversion table.

3. The portable electronic device according to claim 1, further comprising:

a password setting unit that sets a password, wherein, in either case in which the first mode is switched to the second mode or the second mode is switched to the first mode, the control unit prompts a password to be input, and the control unit permits switching of the modes on condition that the password thus input coincides with a password that has been set in the password setting unit.

4. The portable electronic device according to claim 1, wherein the first conversion table is configured such that input characters are not converted into kanji characters, or input characters can be converted into only kanji characters conforming to a predetermined kanji character table designated for each school year.

5. The portable electronic device according to claim 1, further comprising:

a registration unit that registers a profile including an age, wherein, in a case in which an age has been registered with the registration unit when input characters are converted into another type of character set, the control unit selects which one of the first conversion table or the second conversion table is referred to, based on the age registered with the registration unit, regardless of whether the mode that has been set by the setting unit is the first mode or the second mode.

6. A control method comprising:

an operating step of inputting characters by way of an operation unit;

a displaying step of displaying characters that were input in the operating step on a display unit;

a setting step of setting a first mode and a second mode different from the first mode;

a conversion table creating step that extracts and creates a first conversion table and a second conversion table from a single conversion table, in accordance with a mode that has been set by the setting step;

a first controlling step of performing control such that, when characters that were input by way of an operation of the operation unit are converted into another type of character set, in a case in which the first mode has been set in the setting step, the input characters are used for conversion into another type of character set, and the display unit displays a plurality of first-type characters recorded in a first conversion table, based on reference to the first conversion table in which the plurality of first-type characters are recorded, and when one of the plurality of first-type characters displayed on the display unit is selected by way of the operation unit, the characters displayed on the display unit are replaced with the selected type of characters; and a second controlling step of performing control such that, when characters that were input by way of an operation of the operation unit are converted into another type of character set, in a case in which the second mode has been set in the setting step, the input characters are used for conversion into another type of characters, and the display unit displays a plurality of second-type characters recorded in a second conversion table, based on reference to the second conversion table in which the plurality of second-type characters are recorded, the second conversion table being different from the first conversion table, and when one of the plurality of second-type characters displayed on the display unit is selected by way of the operation unit, the characters displayed on the display unit are replaced with the selected type of characters.

7. A non-transitory computer-readable device storing a control program comprising instructions that, when executed by a computing device, cause the computing device to perform operations comprising:

inputting characters by way of an operation unit;

displaying the characters that were input in the operating step on a display unit;

setting a first mode and a second mode different from the first mode;

creating a conversion table by extracting and creating a first conversion table and a second conversion table from a single conversion table, in accordance with a mode that has been set by the setting step;

performing control such that, when characters that were input by way of an operation of the operation unit are converted into another type of character set, in a case in which the first mode has been set in the setting step, the input characters are used for conversion into another type of character set, and the display unit displays a plurality of first-type characters recorded in a first conversion table, based on reference to the first conversion table in which the plurality of first-type characters are recorded, and when one of the plurality of first-type characters displayed on the display unit is selected by way of the operation unit, the characters displayed on the display unit are replaced with the selected type of characters; and performing control such that, when characters that were input by way of an operation of the operation unit are converted into another type of character set, in a case in which the second mode has been set in the setting step, the input characters are used for conversion into another type of character set, and the display unit displays a plurality of second-type characters recorded in a second conversion table, based on reference to the second conversion table in which the plurality of second-type characters are recorded, the second conversion table being different form the first conversion table, and when one of the plurality of second-type characters displayed on the display unit is selected by way of the operation unit, the characters displayed on the display unit are replaced with the selected type of characters.

* * * * *